W. M. RHODES.
SUSPENSION SYSTEM FOR HEADERS.
APPLICATION FILED NOV. 15, 1913.
1,135,619.
Patented Apr. 13, 1915.
4 SHEETS—SHEET 1.
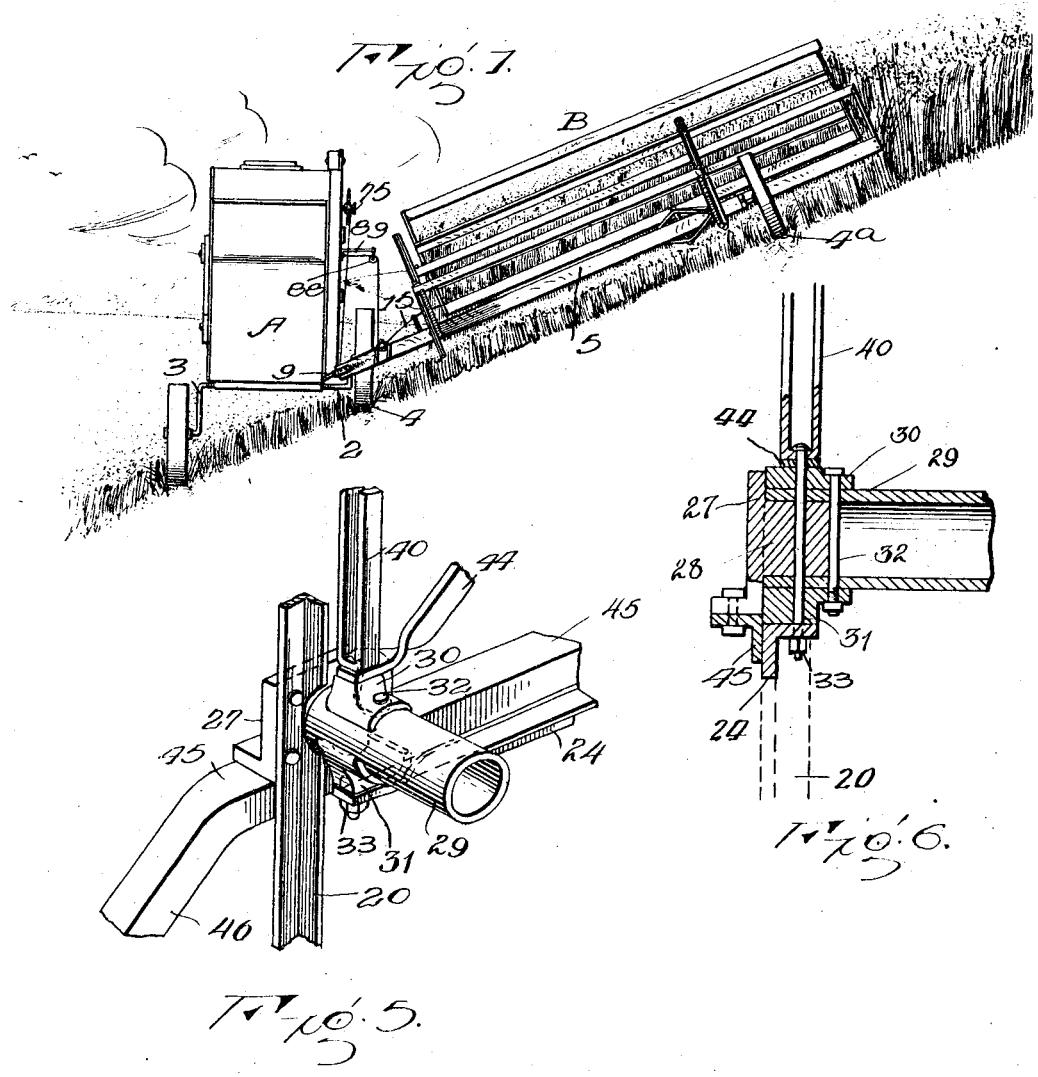
Inventor
W. M. Rhodes
Witnesses
By
Attorneys

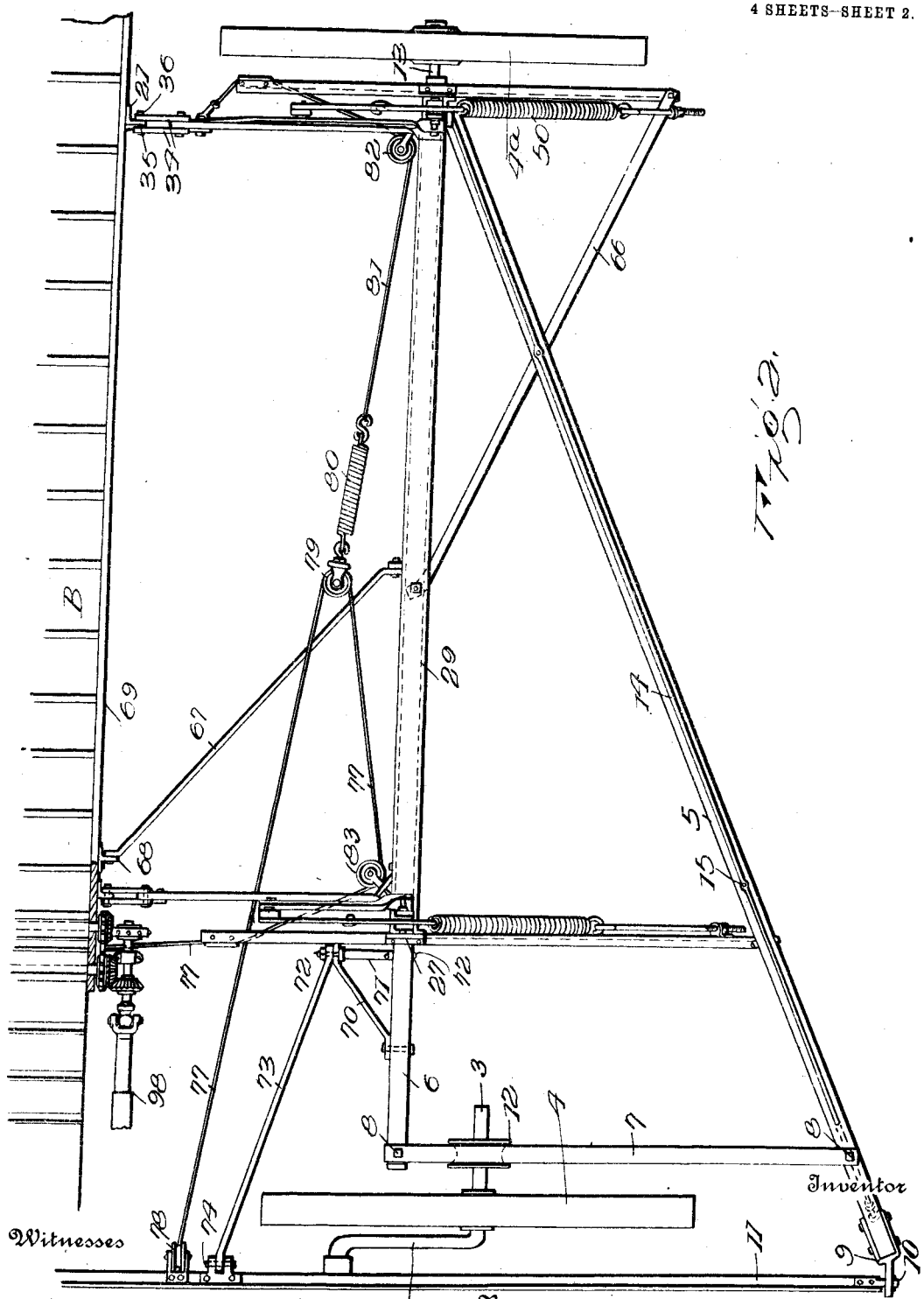

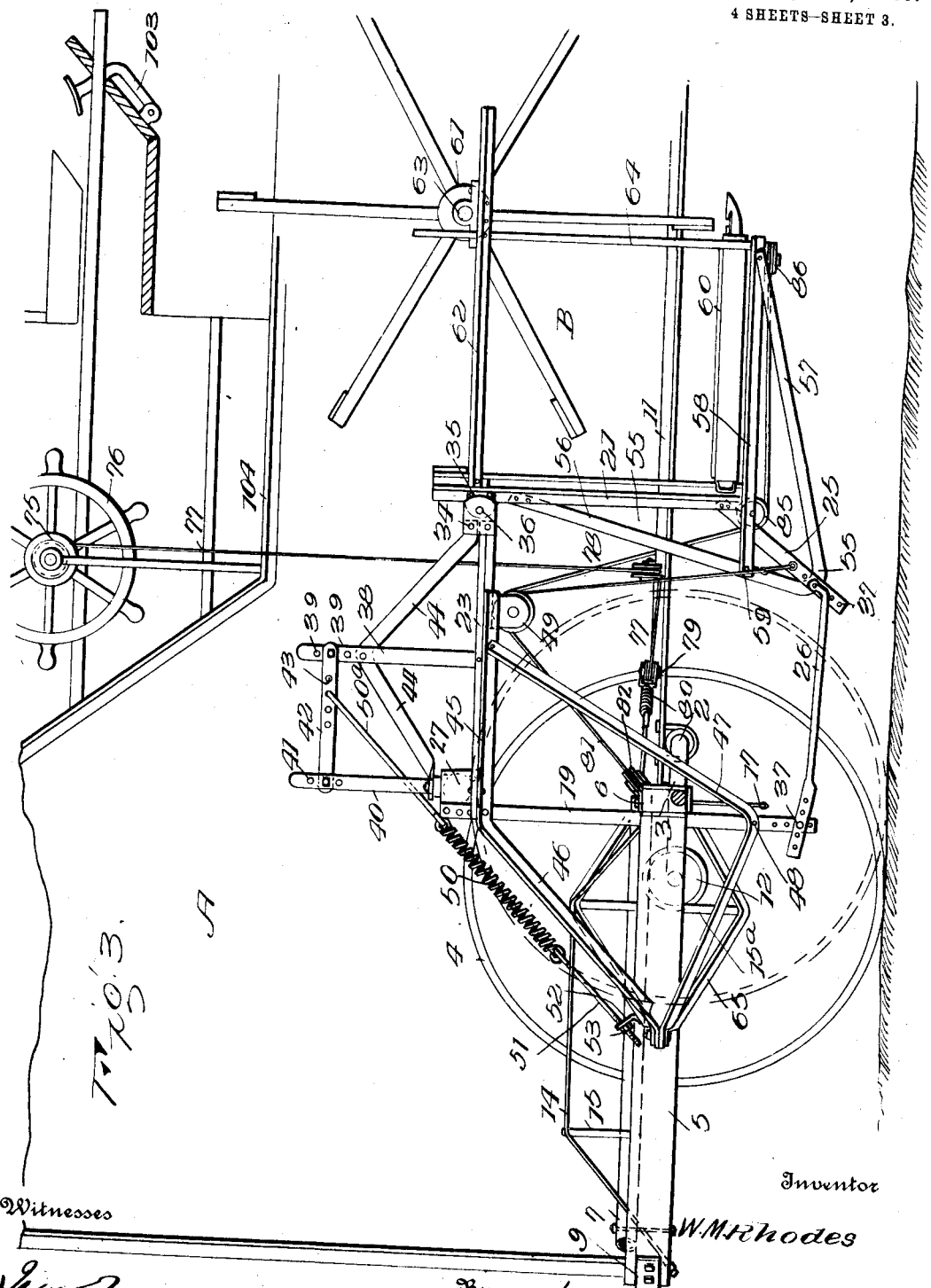

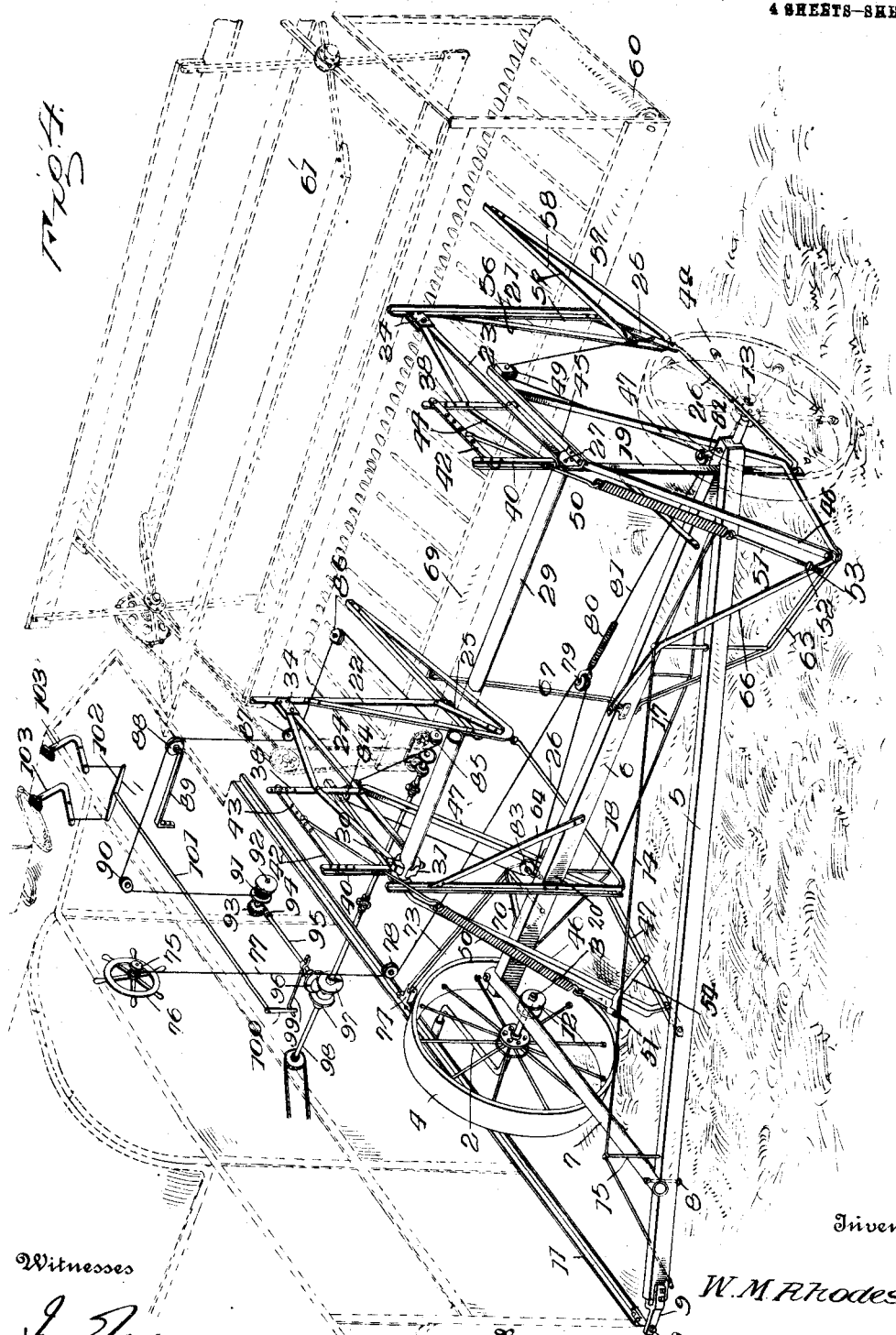

UNITED STATES PATENT OFFICE.

WILLIS M. RHODES, OF MOSCOW, IDAHO.

SUSPENSION SYSTEM FOR HEADERS.

1,135,619.     Specification of Letters Patent.     Patented Apr. 13, 1915.

Application filed November 15, 1913. Serial No. 801,248.

*To all whom it may concern:*

Be it known that I, WILLIS M. RHODES, a citizen of the United States, residing at Moscow, in the county of Latah and State of Idaho, have invented certain new and useful Improvements in Suspension Systems for Headers, of which the following is a specification.

My invention relates to harvesters and particularly to harvesting machines of that type known as combined harvesters, that is, harvesters which combine reaping machinery in the form of a header with threshing machinery.

The primary object of my invention is to provide an improved suspension system for supporting and carrying the header platform and reel.

A further object of my invention is to provide means for so supporting the header platform and suspension system to the body of the harvester that the header platform may be pivotally supported so that its outer end may rise or fall, thus permitting the header to be used on side hills.

A further object of the invention is to provide in conjunction with a body containing threshing mechanism, cranked axles adapted to be turned in opposite directions to support the body or threshing mechanism in a horizontal plane though the ground over which the machine is traveling is laterally inclined, and a header supporting system so mounted that it will compensate for any depression or elevation of the adjacent cranked axle.

A further object of the invention is to provide a header in which the weight of the platform reel and other allied parts are partially counterbalanced by means of springs instead of by means of a weight as is usual, thus permitting the quicker raising or lowering of the header platform and reducing weight.

A further object in this connection is to provide means for adjusting these weight carrying springs so as to equalize the tension at all times.

A further object of the invention is to provide a frame hingedly supporting the reaping mechanism which will provide for a three-point pull upon the outer wheel supporting the reaping mechanism.

Still another object of the invention is to provide means whereby the height of the reaping mechanism of the header, that is, of the header platform, reel and cutting knives may be readily adjusted, and in this connection to provide means whereby this adjustment may be secured either manually or through the medium of power operated mechanism, thus permitting the header platform to be raised or lowered by power, where the machine is traveling over relatively level country, or by manually operated means, where the machine is traveling over rough country and the adjustments are required to be quicker.

A further object of the invention is to provide for equally lifting or lowering both ends of the header, and whereby the strain upon the connections securing this lifting or lowering of the header platform shall be equalized.

Still another object in this connection is to provide resilient means disposed in the platform raising or lowering system which will obviate the jar of the header platform and allied parts.

A further object of the invention is to provide truss systems for the supporting frame which while light will firmly support and hold up the weight of the platform and of the reaping mechanism thereon.

Other objects will appear in the course of the following description.

My invention is illustrated in the accompanying drawings wherein:

Figure 1 is a rear end elevation of a combined harvester constructed in accordance with my invention and operating on a side hill. Fig. 2 is a plan view of the header supporting frame, this view showing a portion of the header mechanism and a portion of the main body of the machine or thresher. Fig. 3 is a side elevation of the mechanism illustrated in Fig. 2. Fig. 4 is a perspective view of the frame for supporting the header platform, reel, etc., the platform, the conveyer therefor, the reel and the casing of the threshing machine being shown in dotted lines. Fig. 5 is a detail perspective view of the pivotal connection between the platform supporting frame and the vertical members of the main frame. Fig. 6 is a fragmentary section through the construction shown in Fig. 5.

Corresponding and like parts are referred to in the following description and indicated in all the views of the accompanying drawings by the same reference characters.

Referring now particularly to Fig. 1, A designates the body of a combined harvester, this body including a supporting frame and a casing inclosing the threshing mechanism of the harvester. B designates the header proper which is connected to the body of the harvester as will be hereafter stated. The threshing mechanism contained within the casing mounted upon or forming part of the body A, has no relation to this present application and therefore requires no description. This body A is mounted at its rear end upon a cranked axle 2 having crank arms 3 which extend in opposite directions. In my pending application, Serial No. 801,247, filed on the 15th day of November, 1913, I have shown means for operating this cranked axle so as to cause one of the traction wheels 4 to be elevated while the other traction wheel is depressed, or whereby the axle may by turned so that both of the traction wheels are supported on a level with each other. Of course, when the machine is moving over level ground, both of the traction wheels 4 are on a level, but when the machine is operating over a side hill as shown in Fig. 1, one of the traction wheels is elevated and the other depressed so that the body of the machine is held in horizontal position. Under these circumstances, the header section B extends upward at an inclination depending upon the inclination of the hill side and it is obvious that where the hill is inclined reversely to that shown in Fig. 1, the header section will extend downward at an inclination to the main body of the machine.

The detail construction of the header section is as follows: Referring particularly to Figs. 2 and 4 it will be seen that the main member of the header supporting system comprises an approximately triangular frame formed of the outwardly and forwardly extending beam 5, the transversely extending beam 6, which is disposed at right angles to the line of draft, and the longitudinally extending member 7. The beam 5 is longer than the beam 6 as shown clearly in Fig. 4 and the member 7 is preferably formed of a pipe or other cylindrical element which is cut away at its ends and bolted to the members 5 and 6 by bolts 8. The outer extremity of the member 5 carries an iron 9 forming an ear, this iron being bifurcated to embrace the member 5 and having a projecting end engaged by a pintle 10 carried upon the rear extremity of the sill member 11 forming one of the sills of the body frame. The stud of the axle crank 3 on the side adjacent the header mechanism is extended and carries upon it a grooved roller 12 upon which the member 7 rests and is supported. It will be seen that it is necessary to make this member 7 cylindrical at least for a portion of its length so that it may fit the grooved roller 12, and also that the grooved roller must have rolling engagement with the member 7 so that it may shift along the member 7 as the axle is raised or lowered. The extremity of the beam 6 carries a stub axle 13 upon which the wheel 4$^a$ is mounted.

The beam 5 is trussed by means of a truss rod or wire 14 passing through the beam at opposite ends and braced outward from the beam by means of struts 15. The beam 6 is likewise trussed by means of a truss wire 17 extending parallel to but beneath the beam 6 and thus being oppositely disposed to the truss rod or wire on the beam 5 and supported from the beam by means of struts or truss rods 18 as clearly shown in Fig. 4.

Mounted upon the beam 6 at the outer end thereof is a vertical angle iron 19, and mounted upon the beam 6 adjacent the inner end thereof is a vertical iron 20 corresponding to the angle iron 19. These angle irons project below the beam 6. Extending parallel to the angle irons 19 and 20 are the vertical angle iron members 21 and 22, and connecting the upper ends of these members 21 and 22 respectively with the angle irons 19 and 20 are the horizontal angle iron arms 23 and 24. Extending diagonally downward from the lower end of each of the vertical members 21 and 22 is the brace 25 seen most clearly in Fig. 3, and from each of these braces extends rearward a connecting rod 26 which connects to the lower end of the corresponding vertical member 19 or 20.

It is to be noted here that there is a pivotal connection between the members 23 and 24 and the vertical members 19 and 20, and a pivotal connection between the members 21 and 22 and said arms 23 and 24, and a pivotal connection between the members 26, the braces 25 and the vertical members 19 and 20. This pivotal connection is formed as follows: As illustrated in detail view, Fig. 5, the vertical member 20 extends upward and attached thereto is a block 27 having a short stub 28. This stub is circular in form and projects into a pipe or tubular member 29. This tubular member extends entirely across the frame and engages the stub of a block 27 of exactly the same character mounted upon the vertical member 19. This tubular member 29 thus braces the members 19 and 20 apart from each other. The members 23 and 24 are rigidly connected to the tubular member 29 so as to rotate therewith around the axes formed by the stubs 28 of the blocks 27. To this end saddle plates 30 and 31 are disposed on opposite sides of the pipe 29 at each end thereof, these saddle plates being connected by bolts 32 and 33 extending diametrically through the pipe 29 and through the saddle plates. The horizontal members 23 and 24 are connected at their rear ends to the pipe 29 each by means of the corresponding bolt 32, the end of each of the members 24 and 25 resting against a seat formed on the outer face of the saddle plate 31 as shown clearly in Figs. 5 and 6. The pipe 29, therefore, forms a transversely extending pivotal support for the members 23 and 24.

The pivotal connection between the bars 23 and 24 and the vertical members 21 and 22 is secured by attaching spaced plates 34 to the ends of the angle irons 23 and 24 and attaching to each of the members 21 and 22 a rearwardly extending ear 35 which extends between said plates and is pivoted thereto by means of a pin 36.

The braces 25 are rigidly attached to the lower ends of the vertical members 21 and 22 and are pivotally connected each to the corresponding rod 26, which in turn is pivotally connected to the lower end of the corresponding vertical member 19 or 20. Each of the braces 25 is provided with a plurality of perforations 37 and the same is true of the downwardly extending ends of the vertical members 19 and 20, thus providing for an adjustment of the rods 26 for a purpose to be later stated.

Extending upward from the middle of each of the members 23 and 24 is a vertical angle iron 38 formed with a plurality of perforations 39 toward its upper end and extending upward from each of the saddle plates 30 is the bifurcated supporting member 40, the upper ends of whose arms are formed with a plurality of perforations 41. Extending between each vertical angle iron 28 and the corresponding member 40 is a bar 42 formed with a plurality of perforations 43. Attached to the plates 34 extending upward to the upper end of each vertical member 38 and extending downward and attached to the saddle plate 30 beneath the base of the member 40 is an angular brace 44 as illustrated clearly in Fig. 3 which is held to the saddle plate 30 and therefore to the tubular member 29 by means of the bolt 33. Attached to each of the vertical members 19 and 20 is an angle iron 45 which is angularly bent so as to provide an arm extending parallel to the corresponding horizontal member 23 or 24 and a downwardly and rearwardly extending arm 46 which extends downward to a point opposite the beam 5.

Connected to each of the members 23 and 24 at about the middle thereof and extending downward to a point adjacent the lower end of the corresponding vertical member 19 or 20 and then upward and connected to the lower extremity of the leg 46 of the member 45, is a brace 47, which is connected by a bolt 48 to the corresponding member 19 or 20. The members 47 and 45, therefore, form an approximately diamond-shaped frame. To the projecting forward end of the member 45 is attached a pulley 49 for a purpose to be later stated.

Mounted upon the downwardly extending arm 46 of each of the members 45 is a coiled contractile spring 50 which is connected at its lower end to the lower end of the portion 46 of member 45 and at its upper end to the bar 42 as illustrated clearly in Fig. 3. Preferably the lower end of the spring is connected by means of a rod 51 to any suitable tensioning device. Thus for instance in Fig. 3, this rod 51 is shown as passing through a lug 52 mounted upon the lower end of the member 45 and the rod 51 is screw threaded and provided with a nut 53 whereby the tension of the spring may be increased or decreased.

Practically the same construction is shown as regards the diamond-shaped frame connected to the member 20 except that in this case a strap 54 is attached to the rearwardly extending portion of the member 47 and extends upward and over the lower end of the portion 46 and is provided with an eye through which the rod 51 passes. Inasmuch as the upright members 38 are rigidly connected to the members 23 and 24 by the brace 44, it will be plain that the action of the springs 50 will be to lift upward on the outer ends of the arms or horizontal members 23 and 24 and thus lift upward upon the forward ends of the pivoted frames formed by the members 23, 21 (or 22), the braces 25 and the members 26.

For the purpose of supporting the elevator platform, I provide the angular brackets 55. Each of these brackets is angular in form having an upwardly extending arm 56, and a forwardly extending arm 57. The upwardly extending arm 56 is riveted or otherwise attached to the upper end of the corresponding vertical angle iron 21 or 22, while the outer end of the arm 57 is riveted to a horizontally disposed frame bar 58 whose rear end is connected to the arm 56 at 59. These bracket members 56—57 and the vertical members 21 and 22 form the support for the frame upon which the conveyer belt 60 is mounted and upon which the reel 61 is mounted. This frame may be formed in any suitable manner but I have shown the outwardly projecting angle irons 62 for supporting the reel shaft 63 and have shown vertical members 64 connecting these arms 62 with the outer ends of the angle irons 58. The details of the reel supporting frame and elevator frame, the details of the reel and elevator form no part of my present invention and may be of any usual or ordinary form.

For the purpose of making the frame as light as possible consistent with sufficient rigidity, I provide the diagonal angle iron truss rods 65 and 66. These truss rods are connected at their outer ends to the rear end of the diamond frame formed by the members 45 and 47 and at their inner ends the truss rods are bolted to the beam 6 at its middle. One of the struts 15 supports the upper truss rods 65 and a strut 15ª engages the middle of the truss rods 66 as shown clearly in Fig. 4.

A truss rod 67 is pivotally connected to an ear 68 projecting from the lower member 69 of the conveyer supporting frame and to the middle of the beam 6 as illustrated clearly in Fig. 2.

A bracket 70 projects outward from the beam 6 adjacent its inner end, the outer end of this bracket being braced from the beam 6 by means of the sleeve 71 and being held to this sleeve by means of the bolt 72. From the outer end of this bracket extends a connecting bar 73 which at its inner end is pivotally connected to ears 74 projecting outward from the sill 11 of the body of the machine. There is thus formed a pivotal connection between the forward inner end of the triangular frame and the sill 11 which while permitting the triangular frame to rotate in a vertical plane in conformity with the inclination of the hillside, does not obstruct the proper movement of the traction wheel and cranked axle.

It is, of course, necessary in headers that means be provided whereby the reaping mechanism of the header may be raised or lowered to conform to the height of the grain being cut, and it is further necessary that this adjustment of the reaping mechanism be made fairly quickly. For this purpose I provide adjusting means which is capable of operation either by power taken from the engine of the thresher, or by manual operation. The mechanism for this purpose is as follows: Projecting from the housing of the thresher and, of course, rigidly supported thereon, is a winding drum 75 having a winding wheel 76 whereby it is operated. From this winding drum extends a flexible connection 77 which passes down beneath a pulley 78 mounted upon the sill 11 or in any other suitable manner, and after passing beneath the pulley 78, the cable passes to a movable pulley 79 operatively connected by means of the spring 80 to a connection 81. This connection 81 extends to a pulley 82 mounted upon the outer end of the bar 6. From thence the flexible connection passes upward to the pulley 49 mounted upon the end of the arm 45, and from thence the flexible connection 81 passes downward to and is engaged with the brace 25 as illustrated clearly in Fig. 3.

The flexible connection 77 after passing through the pulley 79 extends inward toward the thresher and passes under a pulley 83 mounted upon the bar 6 opposite the vertical member 20 and from thence the flexible connection 77 passes to and over a pulley 84 mounted upon the end of the inner arm 45. From thence the flexible connection passes downward and forward to a pulley 85 on the frame of the header platform, then to a pulley 86 disposed beneath the frame of the platform, from thence to a pulley 87 disposed at the end of the platform frame, thence upward to a pulley 88 mounted upon a bracket 89 projecting from the housing or framing inclosing the threshing mechanism, thence inward and over a pulley 90 and downward over a winding drum 91 mounted upon a shaft 92. This shaft carries a worm wheel 93 engaged by a worm 94 mounted upon a worm shaft 95. This shaft carries at its inner end a bevel friction wheel 96 adapted to mesh with the opposed bevel friction wheels 97 which are rigidly mounted upon a power shaft 98.

The shaft 95 is so mounted that it may be shifted laterally at its rear end to bring the friction wheel 96 into engagement with either one of the friction wheels 97, or to a neutral position between the two friction wheels. The shifting of the free end of the shaft is accomplished by means of a shipper arm 99 operatively connected to the free end of the shaft 98 and engageable by means of a crank arm 100 mounted upon a rock shaft 101 having at its end the rocker arm 102 whose opposite ends are operatively connected to pedals 103. It will be obvious now that by depressing one or the other of the treadles 103, the rock shaft will be rocked in one direction or the other, thus shifting the shaft 95 in one direction or the other and thus causing the friction wheel 96 to engage with one or the other of the bevel friction wheels 97 and thus rotating the shaft 95 in one or the other direction causing the drum either to wind up upon the flexible connection 77, or to pay out this flexible connection. It will be seen that thus I provide an adjusting cable or flexible connection 77 which is connected at opposite ends to winding drums and that one of these winding drums is manually operated while the other winding drum is adapted to be thrown into operative engagement with power operated mechanism.

The winding up of either end of the cable or flexible connection 77 will, of course, act to lift upward upon the forward end of the elevator platform, that is, to raise the part of the platform connected to the pulley 87 toward the pulley 88 or lower it from said pulley. At the same time the winding up of the connection 77 will draw upon the connection 81 and this will raise up upon the outer end of the frame, or if the connection 77 is paved out it will slacken the connection 81 allowing the outer end of the header platform to drop.

The object of the spring 80 is to provide a resilient or yielding connection between the cable 77 and the cable 81 so that the shocks and jars transmitted to the header frame by the rising and falling of the traction wheel 4ª due to irregularities in the surface, will not be transmitted to the cable 77 and thus to the winding drums and connected mechanism. This is a very important feature of the invention and adds very much to the easy running of the mechanism and the comfort of the operators.

Where the machine is moving over level ground, the vertical adjustment of the header platform and reaping mechanism connected therewith is controlled by the driver sitting at the forward end of the machine and operating the pedals 103. Where, however, the machine is traveling over rough country with many sudden dips and hollows, it is preferable to have an extra man controlling the height of the reaping mechanism, and under these circumstances the adjustment of the reaping mechanism, platform, reel, etc., is controlled by an operator standing upon a platform 104 and operating the winding drum 75 through the wheel 76. Of course, it will be understood that the winding drum 75 is provided with suitable ratchets for preventing the reverse movement of the wheel after the platform has been adjusted.

The power shaft 98 is illustrated as the shaft by which power is transmitted to the knife bar of the machine and to the reel. The connections of the shaft to the knife bar and the connections to the reel are not shown as these may be of any ordinary or usual character.

It will be noted that the rearward thrust of the traction wheel 4 of the reaping mechanism supported by this wheel is principally resisted by the beam 5, but that it is also resisted by the connecting rod 73. The weight of the header platform, reel and allied parts is very largely counterbalanced by the springs 50, these springs taking the place of the usual counterbalancing arm and weight. The tension of these springs may be adjusted by adjusting the nuts 53, and the point of application of the power exerted by the springs may be changed by adjusting the upper ends of the connecting rods 50ª into engagement with one or the other of the several perforations 43, or by rasing or lowering the cross bar 42. The point of application of the power exerted by the springs is adjusted to correspond with the inclination of the header platform and in accordance with the greater or less leverage exerted upon the platform. The inclination of the platform may be adjusted by changing the adjustment of the rods 26 with relation to the vertical bars 19 and 20, or with relation to the braces 25 and thereby the forward edge of the platform may either be swung down or up as the condition of the grain may require, or the platform may be supported level in a neutral position. The raising or lowering of the platform, reel etc. is secured by means of the winding drums 75 and 91 as previously described.

The operation of this mechanism will be plain from what has gone before. The header supporting frame will, of course, tilt upward or downward depending upon the inclination of the ground and it is obvious that by reason of the bar 7 resting upon the roller 12 which is supported upon the stub of the axle, the inner end of the frame will always be horizontal and always remain a constant distance from the ground without regard to the distance of the body of the machine from the ground as illustrated clearly in Fig. 1.

It will be seen that the greater portion of the weight of the platform and reaping mechanism carried thereon is supported by the springs 50 and that therefore comparatively little weight comes upon the flexible connections or cables 77 and 81 and that therefore comparatively little power is required to adjust the platform and reaping mechanism. The system of bracing and trussing of this frame is such that the frame while particularly light, is very rig'd. It will be noted from Figs. 3 and 4 that the pulleys 49 and 82 which sustain the main portion of the weight of the platform, reel etc. are mounted each upon a diamond-shaped frame composed of the members 45 and the members 47. Each frame is not only rigidly fastened to its corresponding upright angle iron 19, but at its lower end each frame is connected rigidly to the bar 5, the outer diamond frame being connected to the bar 5 and being held rigidly in relation thereto by the truss composed of the members 55 and 56, and that the weight which would tend to draw downward upon the upper ends of the diamond frame composed of the members 45 and 47 is counterbalanced by the leverage exerted by the bar 5 and by the engagement of this bar 5 with the sill 11. These diamond-shaped braces formed by the members 45 and 47 not only act to support the greater portion of the weight of the platform which comes upon the cables, but they also act to brace the vertical members 19 and 20 and these members are further braced from any lateral movement by the braces 6ª which extend upward from the member 6.

It will further be noted that I provide a main frame composed of the members 5, 6 and 7 and sustaining the vertical members 19 and 20, a platform supporting frame pivotally connected to the main frame and composed of the members 21, 23 and 26, and of the brackets directly connected to the platform, and that I further provide in connection with each platform supporting frame, diamond frames composed of the members 46 and 47 rigidly connected to the main frame and to the vertical members, acting to brace the latter and also acting to support the pulleys over which the flexible connections pass to the brackets supporting the platform.

It will further be seen that the platform will always remain horizontal when vertically adjusted and that the members 21 and 22 will always be parallel to the members 19 and 20 whether raised or lowered.

Having thus described the invention what is claimed as new is:—

1. In a harvester body, an axle having the body mounted thereon and having a projecting crank portion which is vertically adjustable, a traction wheel mounted upon the crank portion of the axle, a header carrying frame supported at its inner end upon the crank portion of the axle and movable vertically therewith and pivotally connected to the harvester body, said frame extending laterally from the harvester body, and means supporting the outer end of the said frame to admit of its vertical adjustment.

2. In a harvester, a body, a vertically adjustable cranked axle supporting the body, a crank wheel mounted on the cranked portion of the axle, and a header supporting frame extending laterally from the body and pivotally connected thereto at its inner end and having direct engagement with and supported upon the cranked axle and movable therewith and having vertical movement at its outer end.

3. In a harvester, a body, a cranked axle thereon having an outwardly extending axle stub, a traction wheel mounted on the axle stub, a grooved wheel on the stub, and a header supporting frame extending laterally from the body, pivotally connected to the body at one point, and having a member extending parallel to the body and at the base of the frame and resting upon said grooved wheel.

4. In a harvester, a transversely extending header supporting frame, oppositely disposed vertical members rigidly mounted on the frame, a rotatable member mounted in bearings on and extending between said vertical members, forwardly projecting arms rigidly mounted on said rotatable member, links pivotally connected to the lower ends of the vertical members and extending forward beneath said arms, vertical members operatively connected to the forward ends of said arms and operatively connected to said links, a bracket connected to each of the last named vertical members and adapted to support a header platform, frames each having approximately the form of a diamond and rigidly connected to the first-named vertical members and to said supporting frame, upwardly extending arms rigidly mounted upon the first-named arms at the middle thereof, and springs connected at their lower ends to the lower ends of said diamond-shaped braces extending upward and connected to the upper ends of the said last-named arms.

5. In a harvester, a body, a cranked axle thereon having an outwardly extending axle stub, a traction wheel mounted on the axle stub, a grooved wheel carried by said stub, and a substantially triangular header supporting frame extending laterally from the body, pivotally connected directly to the body at one point, and having link connection to the body at the opposite end of its base, the base of the frame resting upon and having rolling engagement with the grooved wheel on said stub.

6. In a harvester, a body, a cranked axle thereon having an outwardly extending axle stub, a traction wheel mounted on the axle stub, a grooved wheel carried by said stub, a substantially triangular header supporting frame extending laterally from the body, pivotally connected directly to the body at one point, and having link connection to the body at the opposite end of its base, the base of the frame resting upon and having rolling engagement with the grooved wheel on said stub, platform supporting arms operatively mounted on said frame, said arms extending forward and being pivoted for movement in a vertical plane, means for partially counterbalancing said arms, and connections whereby said arms and the platforms supported thereby may be raised or lowed.

7. In a harvester, a header supporting frame, vertical members rigidly mounted thereon, platform supporting arms pivotally connected to the upper ends of the vertical members, platform supporting brackets pivotally connected to the upper ends of the arms, links connecting the lower ends of the brackets to the lower ends of the vertical members, diamond-shaped frames disposed in conjunction with each vertical member and arm and rigidly carried on the corresponding vertical member, a pulley carried upon the diamond-shaped frame at its upper and forward end, flexible connections passing over said pulleys and to the lower ends of the brackets, and means for exerting strain upon said flexible connections to raise or lower the platform.

8. In a harvester, a header supporting frame, vertical members rigidly mounted thereon at opposite ends thereof, platform supporting arms pivotally connected to the upper ends of the vertical members, platform supporting brackets pivotally connected to the upper ends of the arms and depending therefrom, links connecting the lower ends of the brackets to the lower ends of the vertical members, a diamond-shaped frame rigidly mounted on each vertical member and rigidly connected each at its lower end to the header supporting frame. a pulley carried on the upper forward end of each diamond-shaped frame, flexible connections passing over said pulleys and to the lower ends of the brackets, and means for exerting a strain upon said connections to raise or lower the platform.

9. In a harvester, a header supporting frame, vertical members rigidly mounted thereon at opposite ends thereof, platform supporting arms pivotally connected to the upper ends of the vertical members, platform supporting brackets pivotally connected to the upper ends of the arms and depending therefrom, links connecting the lower ends of the brackets to the lower ends of the vertical members, a diamond-shaped frame rigidly mounted on each vertical member and rigidly connected each at its lower end to the header supporting frame, a pulley carried on the upper forward end of each diamond-shaped frame, flexible connections passing over said pulleys and to the lower ends of the brackets, means for exerting a strain upon said connections to raise or lower the platform, and counterbalancing springs operatively connected to the header supporting frame, and to said arms.

10. In a harvester, a header supporting frame, vertical members rigidly mounted thereon, platform supporting arms pivotally connected to the upper ends of the vertical members, upwardly extending members mounted upon said arms, springs operatively connected to the header supporting frame and to said upwardly extending members, platform supporting brackets pivotally connected to the upper ends of the arms, links pivotally connecting the lower ends of the brackets to the lower ends of the vertical members, a diamond-shaped frame rigidly mounted on the vertical members, each connected at its rear end to the header supporting frame, a pulley carried upon each of the diamond-shaped frames at its upper and forward end, flexible connections passing over said pulleys and to the lower ends of the brackets, and means for exerting a strain upon said connections to raise or lower the platform.

11. In a harvester, a header supporting frame, vertical members rigidly mounted thereon, a rotatable transversely extending brace rotatably mounted upon the upper ends of the vertical members, platform supporting arms rigidly connected to said brace and projecting forward therefrom and rotatable therewith, platform supporting brackets pivotally connected to the upper ends of the arms, links pivotally connecting the lower ends of the brackets to the lower ends of the vertical members, a diamond-shaped frame rigidly mounted on each vertical member rigidly connected at its lower end to the header supporting frame, a pulley mounted upon the upper forward end of each diamond-shaped frame, flexible connections passing over said pulleys and to the lower ends of the brackets, means for exerting a strain upon said connections to raise or lower the platform, and means for partially counterbalancing said platform.

12. In a harvester, a header supporting frame, vertical members rigidly mounted thereon, a rotatable transversely extending brace rotatably mounted upon the upper ends of the vertical members, platform supporting arms rigidly connected to said brace and projecting forward therefrom and rotatable therewith, platform supporting brackets pivotally connected to the upper ends of the arms, links pivotally connecting the lower ends of the brackets to the lower ends of the vertical members, a diamond-shaped frame rigidly mounted on each vertical member rigidly connected at its lower end to the header supporting frame, upwardly extending members rigidly connected to each arm, counterbalancing springs operatively connected at their upper ends to said vertical members and at their lower ends operatively connected to the lower ends of each diamond-shaped frame, a pulley mounted upon the upper forward end of each diamond-shaped frame, flexible connections passing over said pulleys and to the lower ends of the brackets, means for exerting a strain upon said connections to raise or lower the platform, and means for partially counterbalancing said platform.

13. In a harvester, a header supporting frame, vertical members rigidly connected thereto, trunnion blocks rigidly connected to the upper ends of the vertical members and having inwardly projecting trunnions, a tubular member extending between the vertical members and rotatably mounted upon said trunnions, oppositely disposed saddles bolted to said tubular member at the ends thereof, forwardly projecting arms each bolted to one of said saddles, a vertical member on each arm, a platform supporting bracket pivotally connected to the forward end of each arm, braces extending from the forward end of each arm to the vertical member in the middle of the arm and from said vertical member to one of said saddles, links pivotally connecting the lower end of each bracket to the lower end of the corresponding vertical member, and flexible connections whereby the platform may be raised and lowered.

14. In a harvester, a header supporting frame, arms pivotally mounted on the frame for vertical movement, reaping mechanism supported by the arms, and means for raising and lowering said arms and the reaping mechanism including a flexible element, power operated winding mechanism connected to one end of said flexible element, and hand operated winding mechanism connected to the opposite end of said flexible element.

15. In a harvester, a header supporting frame, arms pivotally mounted on the frame for vertical movement, reaping mechanism supported by the arms, means for raising and lowering said arms and the reaping mechanism including a flexible element, power operated winding mechanism connected to one end of said flexible element, hand operated winding mechanism connected to the opposite end of said flexible element, and manually operable means for applying power to or disconnecting it from said power operated winding mechanism.

16. In a harvester, a header supporting frame, arms pivotally mounted on the frame for vertical movement, reaping mechanism supported by the arms, means for raising and lowering said arms and the reaping mechanism including a flexible element, independently operable winding drums connected to opposite ends of the flexible element, manually operable means for operating one of said drums, a power shaft, and manually operable means for throwing the other of said drums into or out of operative connection with said power shaft.

17. In a harvester, a header supporting frame, a platform supporting frame pivotally connected to the header supporting frame for vertical movement, reaping mechanism supported by the last named frame, means for raising or lowering said platform supporting frame and reaping mechanism including a flexible connection operatively connected to one end of the platform and to winding mechanism, and a flexible connection connected to the outer end of the platform and resiliently connected to the first named flexible connection.

18. In a harvester, a header supporting frame, a platform supporting frame pivotally connected to the header supporting frame for vertical movement, reaping mechanism supported by the last named frame, means for raising or lowering said platform supporting frame and reaping mechanism including a flexible connection operatively connected to one end of the platform and to winding mechanism, and a flexible connection operatively connected to the outer end of the platform, a coil spring attached to said flexible connection, and a pulley connected to said spring through which the first named flexible connection passes.

19. In a harvester, a header supporting main frame, a platform supporting frame pivotally connected to the main frame for vertical movement, a flexible connection operatively connected to the inner end of the platform and supporting frame, means for holding one end of said flexible connection fixed, means for winding up on or slackening the other end of the flexible connection, a pulley through which said flexible connection passes, a spring connected to the pulley, and a flexible connection passing from said spring to the outer end of the platform supporting frame and operatively connected thereto to raise or lower the platform when the first named flexible connection is wound up or slackened.

20. In a harvester, a header supporting main frame, vertical members mounted upon the main frame, a traction wheel mounted upon the main frame, platform supporting frames pivotally connected to the vertical members, frames rigidly connected to the vertical members and to said main frame and extending parallel to the platform supporting frames, pulleys carried upon said rigid frames, a flexible connection passing over the pulley of one of said rigid frames and operatively connected to the platform supporting frame, means for winding up upon said flexible connection, a flexible connection passing over the pulley of the outer rigid frame and operatively connected at one end to the platform supporting frame, and operative connections between said last named flexible connection and the first named flexible connection.

21. In a harvester, a header supporting frame, vertical members rigidly mounted upon the frame, arms pivotally mounted upon the upper ends of the vertical members for movement in a vertical plane, platform supporting brackets pivoted to and depending from the forward ends of said arms, links pivotally connected to the lower ends of the brackets and pivotally connected to the lower ends of the vertical members, and means for adjusting said links to thereby tilt the brackets and the platform carried thereby.

In testimony whereof I affix my signature in presence of two witnesses.

WILLIS M. RHODES. [L. S.]

Witnesses:
 FREDERIC B. WRIGHT.
 J. D. YOAKLEY.